(12) United States Patent
Gutierrez et al.

(10) Patent No.: US 10,209,405 B2
(45) Date of Patent: Feb. 19, 2019

(54) MOBILE ELECTRONIC DEVICE COVER PLATE COMPRISING A THIN SAPPHIRE LAYER

(71) Applicant: GTAT Corporation, Merrimack, NH (US)

(72) Inventors: Thomas Gutierrez, Hollis, NH (US); Vikram Singh, Andover, MA (US)

(73) Assignee: GTAT Corporation, Hudson, NH (US)

(*) Notice: Subject to any disclaimer, the term of this patent is extended or adjusted under 35 U.S.C. 154(b) by 235 days.

(21) Appl. No.: 14/288,989

(22) Filed: May 28, 2014

(65) Prior Publication Data
US 2014/0355126 A1   Dec. 4, 2014

Related U.S. Application Data

(60) Provisional application No. 61/828,043, filed on May 28, 2013.

(51) Int. Cl.
| | | |
|---|---|---|
| *G02B 1/14* | (2015.01) | |
| *G02B 1/11* | (2015.01) | |
| *B32B 17/06* | (2006.01) | |
| *B32B 37/12* | (2006.01) | |
| *B32B 38/00* | (2006.01) | |

(52) U.S. Cl.
CPC .............. *G02B 1/11* (2013.01); *B32B 17/06* (2013.01); *G02B 1/14* (2015.01); *B32B 37/12* (2013.01); *B32B 38/0012* (2013.01); *B32B 2457/202* (2013.01); *B32B 2457/208* (2013.01); *Y10T 156/11* (2015.01); *Y10T 428/24967* (2015.01); *Y10T 428/26* (2015.01)

(58) Field of Classification Search
CPC .............. G02B 1/10; G02B 1/14; B32B 2457/20–2457/208; Y10T 428/24967; Y10T 428/26
USPC .......................................................... 349/122
See application file for complete search history.

(56) References Cited

U.S. PATENT DOCUMENTS

| | | | |
|---|---|---|---|
| 8,289,484 B2 | 10/2012 | Matsuhira et al. | |
| 9,336,989 B2* | 5/2016 | Henley | C30B 29/20 |
| 2006/0003587 A1 | 1/2006 | Hsu | |
| 2009/0194162 A1 | 8/2009 | Sivaram et al. | |
| 2009/0308239 A1 | 12/2009 | Jones et al. | |
| 2012/0212890 A1 | 8/2012 | Hoshino et al. | |
| 2012/0220068 A1 | 8/2012 | Petti et al. | |
| 2013/0236699 A1* | 9/2013 | Prest | B32B 9/002 |
| | | | 428/157 |
| 2014/0162043 A1* | 6/2014 | Schmid | B32B 17/06 |
| | | | 428/220 |

FOREIGN PATENT DOCUMENTS

WO    WO 97-13169 A1    4/1997

OTHER PUBLICATIONS

International Search Report dated Sep. 24, 2014 issued in connection with PCT/US2014/039551.

* cited by examiner

*Primary Examiner* — Derek S Chapel
(74) *Attorney, Agent, or Firm* — Parker Ibrahim & Berg LLP; Stephen D. LeBarron

(57) ABSTRACT

An electronic device comprising a cover plate is disclosed. The cover plate comprises one or more thin sapphire layers having a thickness of from about 50 microns to about 500 microns. Also disclosed are methods for preparing these thin sapphire layers.

32 Claims, 1 Drawing Sheet

MOBILE ELECTRONIC DEVICE COVER PLATE COMPRISING A THIN SAPPHIRE LAYER

CROSS-REFERENCE TO RELATED APPLICATION

This application claims the benefit of U.S. Provisional Patent Application Ser. No. 61/828,043, filed May 28, 2013, the entire contents of which are incorporated herein by reference.

BACKGROUND OF THE INVENTION

1. Field of the Invention

The present invention relates to a mobile electronic device comprising a sapphire cover plate.

2. Description of the Related Art

There are many types of mobile electronic devices currently available which include a display window assembly that is at least partially transparent. These include, for example, handheld electronic devices such media players, mobile telephones (cell phones), personal data assistants (PDAs), pagers, tablets, and laptop computers and notebooks. The display screen assembly may include multiple component layers, such as, for example, a visual display layer such as a liquid crystal display (LCD), a touch sensitive layer for user input, and at least one outer cover layer used to protect the visual display. Each of these layers are typically laminated or bonded together.

Many of the mobile electronic devices used today are subjected to excessive mechanical and/or chemical damage, particularly from careless handling and/or dropping, from contact of the screen with items such as keys in a user's pocket or purse, or from frequent touch screen usage. For example, the touch screen surface and interfaces of smartphones and PDAs can become damaged by abrasions that scratch and pit the physical user interface, and these imperfections can act as stress concentration sites making the screen and/or underlying components more susceptible to fracture in the event of mechanical or other shock. Additionally, oil from the use's skin or other debris can coat the surface and may further facilitate the degradation of the device. Such abrasion and chemical action can cause a reduction in the visual clarity of the underlying electronic display components, thus potentially impeding the use and enjoyment of the device and limiting its lifetime.

Various methods and materials have been used in order to increase the durability of the display windows of mobile electronic devices. For example, polymeric coatings or layers can be applied to the touch screen surface in order to provide a barrier against degradation. However, such layers can interfere with the visual clarity of the underlying electronic display as well as interfere with the touch screen sensitivity. Furthermore, as the coating materials are often also soft, they can themselves become easily damaged, requiring periodic replacement or limiting the lifetime of the device.

Another common approach is to use more highly chemically and scratch resistant materials as the outer surface of the display window. For example, touch sensitive screens of some mobile devices may include a layer of chemically-strengthened alkali aluminosilicate glass, with potassium ions replacing sodium ions for enhanced hardness, such as the material referred to as Gorilla® glass available from Corning. However, even this type of glass can be scratched by many harder materials, including metal keys, sand, and pebbles, and, further, as a glass, is prone to brittle failure and shattering. Sapphire has also been suggested and used as a material for either the outer layer of the display assembly or as a separate protective sheet to be applied over the display window. However, sapphire is relatively expensive, particularly at the currently available thicknesses.

Thus, while materials are available which can enable the display of a mobile electronic device to be relatively resistant to damage, there remains a need in the industry for materials and methods for providing improved mechanical toughness and scratch resistance without reducing transmittance.

SUMMARY OF THE INVENTION

The present invention relates to an electronic device comprising a cover plate having at least one transparent display region. The cover plate comprises one or more sapphire layers having a thickness of from about 50 microns to about 500 microns, such from about 50 microns to about 400 microns, from about 50 microns to about 250 microns, and from about 50 microns to about 100 microns. The cover plate may be a single, free-standing sapphire layer or may comprise more than one sapphire layer, each having a thickness of from about 50 microns to about 500 microns. The cover plate can be affixed to the surface of a display element of the electronic device, or it may be a protective layer that is removably positioned or placed on top of the display element. Preferably the thin sapphire layer is the front surface of the cover plate. The present invention further relates to the cover plate comprising one or more sapphire layers having a thickness of from about 50 microns to about 500 microns, as well as to the sapphire layer itself.

The present invention further relates to a method of preparing a cover plate of an electronic device, and preferably the cover plate of the present invention is prepared by this method. In one embodiment, the method comprises the steps of providing a layer of sapphire having an initial thickness and reducing the layer of sapphire from the initial thickness to a thickness of from about 50 microns to about 500 microns. Optionally the resulting layer of sapphire is polished. In another embodiment, the method comprises the steps of providing a donor body of sapphire, implanting through the top surface of the donor body with an ion dosage to form a cleave plane beneath the top surface, exfoliating the sapphire layer from the donor body along the cleave plane, and forming the cover plate comprising this sapphire layer, which has a thickness of from about 50 microns to about 100 microns. Preferably, the ion dosage comprises hydrogen or helium ions.

It is to be understood that both the foregoing general description and the following detailed description are exemplary and explanatory only and are intended to provide further explanation of the present invention, as claimed.

DETAILED DESCRIPTION OF THE INVENTION

Figure 1:
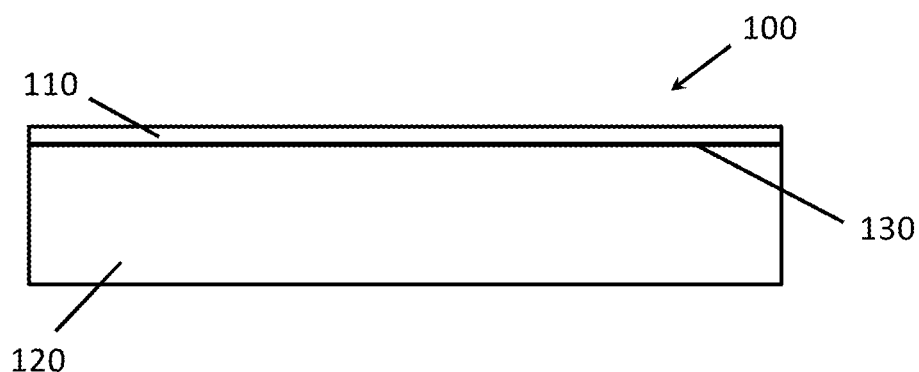
FIG. 1, FIG. 2, and FIG. 3 show various embodiments of the cover plate of the electronic device of the present invention.

The present invention relates to an electronic device comprising a cover plate having at least one sapphire layer, as well as to the cover plate, the sapphire layer, and methods to prepare them.

The electronic device of the present invention comprises a cover plate having at least one transparent display region through which an image can be displayed, such as from a display element upon which the cover plate is placed. Non-transparent regions may also be present, particularly as decorative elements such as borders or as elements to delineate various functional sections of the display. The electronic device can be any known in the art comprising a display or display element, such as mobile or portable electronic devices including, but not limited to, electronic media players for music and/or video, such as an mp3 player, mobile telephones (cell phones), personal data assistants (PDAs), pagers, laptop computers, or electronic notebooks or tablets. The display element of the device may include multiple component layers, including, for example, a visual display layer such as an LCD and a touch sensitive layer as part of a touch screen application. The cover plate can be affixed to the display surface of the display element of the device or it can be a separate protective layer that can be placed or positioned over or on top of the display element and later removed if desired.

The cover plate of the electronic device of the present invention comprises one or more sapphire layers or laminae having a thickness of from about 50 microns to about 500 microns, including, for example, from about 50 microns to about 400 microns, from about 50 microns to about 300 microns, from about 50 microns to about 250 microns, from about 50 microns to about 200 microns, from about 50 microns to about 150 microns, and from about 50 microns to about 100 microns. Thus, the cover plate may be a single, free-standing sapphire layer or may comprise multiple layers, at least one of which has a thickness of from about 50 microns to about 500 microns. The cover plate may also comprise more than one sapphire layer or lamina having a thickness of from about 50 microns to about 500 microns, including 2-10 layers, such as 2-5 layers. For example, the cover plate may be a single, free-standing sapphire multi-layer composite, wherein in each layer has a thickness of from about 50 microns to about 500 microns. Preferably, the sapphire layer is the exterior layer of the cover plate and the electronic device. The overall thickness of the cover plate of the electronic device of the present invention can vary depending on a variety of factors, including, for example, the number of layers, the desired size of the transparent display region, and the size of the device. In general, the cover plate has a thickness that is less than about 5 mm, such as less than about 3 mm, for a multilayer cover plate.

Sapphire that is thin, having a thickness of from about 50 microns to about 500 microns, is desirable from a cost point of view. For example, sapphire having a thickness of about 50 microns can be an order of magnitude cheaper than the sapphire having a typical thickness. However, this sapphire is extremely difficult to prepare while also maintaining the overall scratch resistance, hardness, and durability of the material. The sapphire layer of the cover plate used in the electronic device of the present invention preferably has mechanical and physical properties similar to thicker sapphire layers. For example, at room temperature, the ultrathin sapphire layer preferably has a flexural strength of at least about 700 MPA, including between about 800 and 1000 MPa, a fracture toughness (i.e., the ability of the material containing a crack or scratch to resist fracture) of greater than 1 MPa, including between about 2 and 5 MPa, a Knoop hardness of greater than about 15 GPa, including between about 17 and about 20 GPa, and/or a Vickers hardness of greater about 1000 kg/m, including between about 2000 and 3000 kg/m. The modulus, such as the Young's modulus, is also similar to the modulus of sapphire, which is typically between about 300-400 GPa, but can vary depending on the desired properties of the cover plate (such as touch sensitivity).

The cover plate may comprise a sapphire layer combined with one or more permanent or temporary carrier substrates or layers that provide additional desirable features to the cover plate. For example, the cover plate may further comprise a transparent layer affixed to the sapphire layer. The transparent layer can be any transparent material known in the art including, for example, a layer comprising glass, such as soda-lime, borosilicate, or aluminosilicate glass, including chemically-strengthened alkali aluminosilicate glass (such as the material referred to as Gorilla® glass available from Corning), or a layer comprising a polymeric material, such as a polycarbonate or a polymethacrylate such as polymethyl methacrylate (PMMA). The sapphire layer and the transparent layer may be combined using any technique known in the art, forming an interface in between, including the methods described in U.S. patent application Ser. No. 12/980,424 entitled, "A Method to Form a Device by Constructing a Support Element on a Thin Semiconductor Lamina", filed Dec. 10, 2010, now U.S. Pat. No. 8,173,452, incorporated in its entirety by reference herein. For example, the interface may be formed by bonding with an adhesive layer, thereby affixing the sapphire layer to the surface of the transparent layer. Examples of suitable adhesives include, but are not limited to, polymers or combinations of polymers such as poly(propylene carbonate) (PC), poly(ethylene carbonate) (PEC), or poly(butylenes carbonate) (PBC). Electrostatic adhesion may also be used. In addition, the interface may be formed by thermally bonding the sapphire lamina to the transparent layer, such as through thermal compression bonding at, for example, pressures of from about 5-100 psi, including 40 psi, and temperatures from about 300-500° C., including 400° C. Specific bonding conditions would vary depending on the specific type of transparent layer used. Furthermore, the transparent layer may be fused or melted to the sapphire layer to form an interface, and the temperature will depend on the type of material used as the transparent layer. For example, temperatures for melting a glass substrate to the sapphire may be on the order of 650-1050° C. while lower temperatures, such as 110-150° C., would be suitable if the substrate is plastic.

In one embodiment, the transparent layer is a subsurface layer having a front or exterior-facing surface to which the sapphire layer is attached, thereby forming a multilayer composite. The subsurface layer can be thicker or thinner than the sapphire layer, depending on its purpose. For example, the subsurface layer can be relatively much thicker than the sapphire layer in order to provide improved strength, particularly when the sapphire layer has a thickness of less than about 200 microns. For example, the subsurface layer can be a glass having a thickness of greater than 0.2 mm, including greater than 0.3 mm or 0.4 mm, such as between about 0.3 mm to about 1.0 mm By combining a thicker subsurface layer with the thin sapphire layer for the cover plate of the electronic device of the present invention, the composite would retain the desirable surface characteristics of the sapphire, such as hardness and scratch and smudge resistance, while also taking advantage of the desirable bulk properties of the subsurface material, such as good fracture resistance and low cost. For example, in a sapphire-glass composite structure, the sapphire would enhance the shatter and scratch resistance of the glass while, for a sapphire-polymeric material composite, the combination would be much more resistant to mechanical damage, such as cracking. Such composites would not compromise the transparency of the cover plate. Other advantageous combinations of these thin sapphire layers and transparent substrates are also possible and can be determined by one of ordinary skill in the art, given the benefit of this disclosure.

As a specific example of this embodiment, a cover plate comprising a sapphire multilayer composite for the electronic device of the present invention is shown in FIG. 1. As shown, sapphire composite 100 comprises sapphire lamina 110, with a thickness of from about 50 microns to about 500 microns, attached to subsurface layer 120, such as a glass or plastic substrate having a greater thickness, forming interface 130, which is formed at the lower surface of sapphire lamina 110 and the front (upper) surface of subsurface layer 120.

In another embodiment, the transparent layer affixed to the sapphire layer is an exterior surface coating layer. Thus, while preferably, the sapphire layer is the exterior layer of the cover plate and the electronic device, an antireflective and/or oleophobic coating, or other desirable exterior transparent layer may also be applied to the sapphire layer. Typically this exterior transparent surface coating layer has a thickness of less than 2 microns, such as between about 0.001 microns to about 1.5 microns.

The cover plate may further comprise at least one transparent conducting oxide layer. This is particularly preferred for an electronic device including a capacitive touch screen in the display element in which the touch screen electrical components are integrated with the cover plate. Use of a cover plate comprising a sapphire lamina having a thickness of from about 50 microns to about 500 microns could facilitate simpler integration of a capacitive touch screen into a display. For example, a capacitive touch screen structure in general consists of two layers of transparent conducting oxide (TCO), often separated by a dielectric layer. The two TCO layers are typically patterned into lines, with the lines on the first layer running perpendicular to the lines on the second layer, although other line patterns are also possible. The pitch of these patterned lines may be between 0.1 and 10 mm (such as 6 mm), and the width of these patterned lines may be between 0.2 and 6 mm (such as 5.9 mm or 1 mm) The dielectric layer can be a layer of glass, or, alternatively, may be a sputtered thin film, leading to a configuration having an overall thinner structure.

Figure 2:
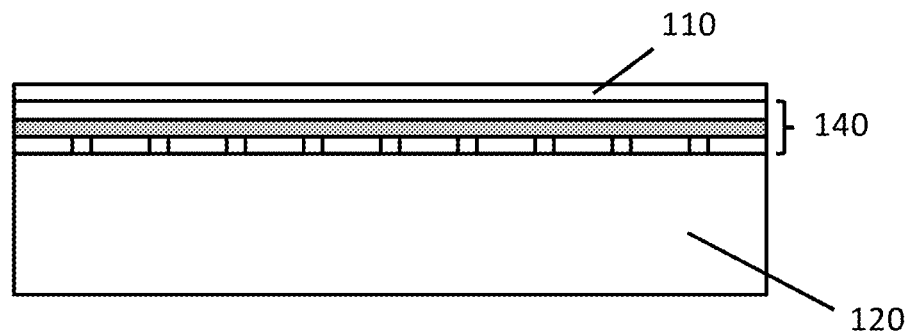
Figure 3:
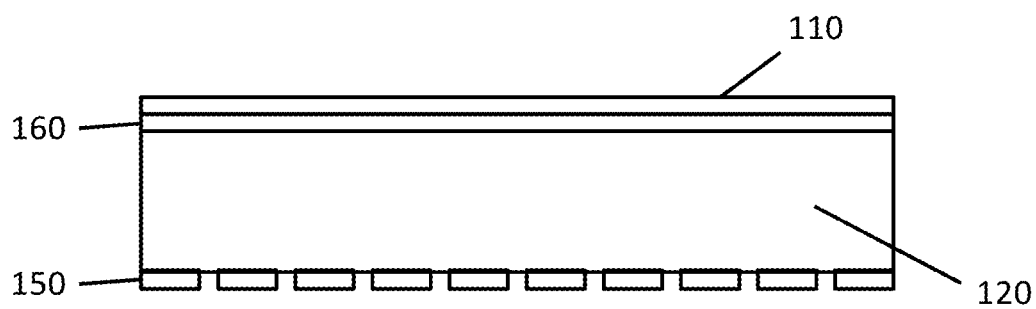

The cover plate of the electronic device of the present invention may comprise any of these configurations of TCO layers. Specific examples are shown in FIG. 2 and FIG. 3. For example, as shown in FIG. 2, by using a sapphire lamina having a thickness of from about 50 microns to about 500 microns, particularly from about 50 microns to about 100 microns, TCO/thin dielectric/TCO structure 140 can be moved to the front of subsurface layer 120, with sapphire layer 110 on top. Thus, as shown, the TCO layers are positioned between the sapphire layer and the transparent subsurface layer. This could advantageously increase the capacitance between a user's finger and the upper layer of TCO, which would increase the signal strength of the touch screen sensor relative to a standard touch screen device, allowing improved sensitivity, accuracy, and/or reduced power consumption in the touch sensor.

Alternatively, a cover plate comprising a thin sapphire layer could also act as the touch screen dielectric. This embodiment is shown in FIG. 3, in which TCO layers 150 and 160 are deposited on each side of a subsurface layer 120, which can be a glass or plastic sheet, and each is patterned as described above. Sapphire lamina 110 is the affixed to one surface of subsurface layer 120, with one layer of the patterned TCO 160 disposed between subsurface layer 120 and sapphire lamina 110. This structure would again offer an increase in signal strength for the touch sensor, as well as providing a simpler fabrication process since there is no need for a deposited dielectric layer.

The sapphire layer of the cover sheet can be prepared using a variety of different methods. For example, the sapphire layers can be prepared by cutting or slicing layers from a donor sapphire material and mechanically grinding the resulting material down to the desired thickness. An optional polishing step may be used if needed to remove any unwanted surface defects. Such a method is particularly useful for sapphire layers having a thickness of greater than about 100 microns, although thinner sapphire layers can also be produced by this method. Alternatively, for a sapphire layer having a thickness of from about 50 microns to about 100 microns, the sapphire layer can be prepared using various layer transfer methods known to remove thin layers from a donor material, including, for example, controlled spalling or ion implantation and exfoliation method, such as the ion implantation/exfoliation method generally described in U.S. patent application Ser. No. 12/026,530 entitled, "Method to Form a Photovoltaic Cell Comprising a Thin Lamina", filed Feb. 5, 2008 and published as U.S. Patent Application Publication No. 2009/0194162 and U.S. patent application Ser. No. 13/331,909 entitled, "Method and Apparatus for Forming a Thin Lamina", filed Dec. 20, 2011, both of which are incorporated in their entireties by reference herein, for the fabrication of a photovoltaic cell comprising a thin semiconductor lamina formed of non-deposited semiconductor material. Such an ion implantation/exfoliation method, which has not previously been considered for sapphire having a thickness of from about 50 to about 500 microns, would be more advantageous over current methods of preparing thin wafers by sawing or cutting since the very properties considered desirable about sapphire (hardness and strength) can make it very difficult, time consuming, and costly to cut, grind, and optionally polish. In addition, sawing or cutting methods produce significant kerf losses, wasting valuable material, and cannot reliably be used to produce thin sapphire lamina, particularly ultrathin lamina having a thickness of approximately 50 microns.

Therefore, the present invention further relates to a method of preparing a sapphire layer or lamina, as well as to the sapphire layer, particularly a free standing lamina or sheet, having a thickness of from about 50 microns to about 500 microns, including any of the thickness ranges described above. In one embodiment, the sapphire layer is prepared by a method comprising the steps of providing a layer of sapphire having an initial thickness, reducing the layer of sapphire from the initial thickness to a thickness of from about 50 microns to about 500 micron; and optionally polishing the layer of sapphire. The sapphire layer can be provided by any method known in the art, including the sawing method described above, and the thickness of the sapphire layer can be reduced using a variety of different methods, including mechanical grinding. In another embodiment, the sapphire layer is prepared by a method comprising the steps of providing a donor body of sapphire comprising a top surface and subsequently implanting an ion dosage through the top surface of the donor body. Using this implantation method, a cleave plane is formed beneath the top surface of the donor body, and the sapphire layer can then be exfoliated from the donor body along this cleave plane. The ion dosage can comprise, for example, hydrogen, helium, or a combination thereof. Implantation conditions can be varied as needed to produce a sapphire lamina having targeted properties, such as thickness and strength. For example, the ion dosage may be any dosage between about $1.0\times10^{14}$ and $1.0\times10^{18}$ H/cm$^2$, such as 0.5-3.0$\times10^{17}$ H/cm$^2$. The dosage energy can also be varied, such as between about 500 keV to about 3 MeV. In some embodiments, the ion implantation temperature may be maintained between about 200 and 950° C., such as between 300 and 800° C. or between 550 and 750° C. In some embodiments, the implant temperature may be adjusted depending upon the specific type of material and the orientation of the sapphire donor body. Other implantation conditions that may be adjusted may include initial process parameters such as implant dose and the ratio of implanted ions (such as H/He ion ratio). In other embodiments, implant conditions may be optimized in combination with exfoliation conditions such as exfoliation temperature, exfoliation susceptor vacuum level, heating rate and/or exfoliation pressure. For example, exfoliation temperature may vary between about 400° C. to about 1200° C. By adjusting implantation and exfoliation conditions, the area of the resulting lamina that is substantially free of physical defects can be maximized. The resulting sapphire layer may be further processed if needed, such as to produce smooth final surfaces.

The sapphire used in either embodiment can be produced using any method known in the art. For example, the sapphire can be prepared in a crystal growth apparatus, which is a high-temperature furnace capable of heating and melting a solid feedstock, such as alumina, in a crucible at temperatures generally greater than about 1000° C. and subsequently promoting resolidification of the resulting melted feedstock material to form a crystalline material, such as a sapphire boule. Preferably, the sapphire is prepared in a heat exchanger method crystal growth furnace, in which a crucible comprising alumina feedstock and at least one single crystal sapphire seed is heated above its melting point to melt the feedstock without substantial melting of the seed, and heat is then removed from the crucible using a heat exchanger, such as a helium-cooled heat exchanger, provided in thermal communication with the bottom of the crucible and positioned under the seed. This method has been shown to produce large, high quality sapphire boules from which the sapphire can be readily removed using available methods. For example, the sapphire can be sliced or cut from a cylindrical portion of a sapphire boule and, as such, is provided in wafer form, having a thickness of, for example, greater than about 0.5 mm, such as from about to 1 mm to about 5 mm. A sapphire wafer of this thickness can be used to produce multiple sapphire layers, further reducing cost, and the remaining portion can be resold or recycled for some other application, including as feedstock for producing another sapphire boule.

The present invention further relates to a method of preparing a cover plate of an electronic device. The method comprises the steps of preparing at least one sapphire layer having a thickness of from about 50 microns to about 500 microns and subsequently incorporating one or more of these layers into a cover plate. Preferably, the sapphire layer is prepared using either embodiment of the methods described in more detail above, and these layers are incorporated into a cover plate also using any of the methods discussed in more detail above, including, for example, providing a transparent subsurface layer having a front surface and affixing the sapphire layer to the front surface of the transparent subsurface layer.

The foregoing description of preferred embodiments of the present invention has been presented for the purposes of illustration and description. It is not intended to be exhaustive or to limit the invention to the precise form disclosed. Modifications and variations are possible in light of the above teachings, or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An electronic device comprising:
   at least one display element having a display surface; and
   a cover plate for the at least one display element having at least one transparent display region, wherein the cover plate comprises one or more free-standing mechanically ground and polished sapphire layers each having a thickness of from about 50 microns to about 500 microns, wherein the cover plate is affixed to the display surface, and
   wherein at least one sapphire layer of the free-standing mechanically ground and polished one or more sapphire layers is prepared by a method comprising the steps of:
   i) providing a free-standing layer of sapphire having an initial thickness;
   ii) mechanical grinding the free-standing layer of sapphire from the initial thickness to a thickness of from about 50 microns to about 500 microns; and
   iii) polishing the free-standing layer of sapphire.

2. The electronic device of claim 1, wherein at least one sapphire layer of the one or more free-standing mechanically ground and polished sapphire layers has a thickness of from about 50 microns to about 400 microns.

3. The electronic device of claim 1, wherein at least one sapphire layer of the one or more free-standing mechanically ground and polished sapphire layers has a thickness of from about 50 microns to about 250 microns.

4. The electronic device of claim 1, wherein at least one sapphire layer of the one or more free-standing mechanically ground and polished sapphire layers has a thickness of from about 50 microns to about 100 microns.

5. The electronic device of claim 1, wherein the cover plate is one free-standing sapphire layer.

6. The electronic device of claim 1, wherein the cover plate comprises more than one free-standing sapphire layer each having a thickness of from about 50 microns to about 500 microns.

7. The electronic device of claim 1, wherein at least one sapphire layer of the one or more free-standing mechanically ground and polished sapphire layers is an exterior layer of the cover plate.

8. The electronic device of claim 1, wherein the cover plate further comprises a transparent layer affixed to at least one sapphire layer of the one or more sapphire layers.

9. The electronic device of claim 8, wherein the at least one sapphire layer and the transparent layer are affixed by an adhesive layer.

10. The electronic device of claim 8, wherein the at least one sapphire layer and the transparent layer are thermally bonded.

11. The electronic device of claim 8, wherein the at least one sapphire layer and the transparent layer are fused together.

12. The electronic device of claim 8, wherein the transparent layer is a subsurface layer having a front surface, and wherein the at least one sapphire layer is affixed to the front surface of the subsurface layer.

13. The electronic device of claim 12, wherein the subsurface layer comprises glass.

14. The electronic device of claim 13, wherein the glass is a soda-lime glass.

15. The electronic device of claim 13, wherein the glass is a borosilicate glass.

16. The electronic device of claim 13, wherein the glass is an aluminosilicate glass.

17. The electronic device of claim 16, wherein the aluminosilicate glass is a chemically-strengthened alkali aluminosilicate glass.

18. The electronic device of claim 12, wherein the subsurface layer comprises a polymeric material.

19. The electronic device of claim 18, wherein the polymeric material is a polycarbonate.

20. The electronic device of claim 18, wherein the polymeric material is a polymethacryate.

21. The electronic device of claim 12, wherein the cover plate further comprises a transparent conducting oxide layer disposed on the subsurface layer.

22. The electronic device of claim 21, wherein the transparent conducting oxide layer is between the at least one sapphire layer and the subsurface layer.

23. The electronic device of claim 21, wherein the transparent conducting oxide layer is patterned.

24. The electronic device of claim 8, wherein the transparent layer is an exterior surface coating layer.

25. The electronic device of claim 24, wherein the exterior surface coating layer is an anti-reflective layer.

26. The electronic device of claim 25, wherein the anti-reflective layer has a thickness of from about 0.01 microns to about 1.5 microns.

27. The electronic device, of claim 1, wherein the electronic device is an electronic media player, a mobile telephone, a personal data assistant, a pager, a tablet, a laptop computer, or an electronic notebook.

28. The electronic device of claim 1, wherein at least one sapphire layer of the one or more free-standing mechanically ground and polished sapphire layers comprises single crystal sapphire prepared in a crystal growth furnace.

29. The electronic device of claim 28, where the crystal growth furnace is a heat exchanger method furnace.

30. A method of preparing a cover plate of an electronic device, the cover plate having at least one transparent display region and comprising one or more sapphire layers, wherein the method comprises the steps of:
   i) providing a free-standing layer of sapphire having an initial thickness;
   ii) mechanically grinding the free-standing layer of sapphire from the initial thickness to a thickness of from about 50 microns to about 500 microns;
   iii) polishing the free-standing layer of sapphire; and
   iv) forming the cover plate from the free-standing mechanically ground and polished sapphire layer.

31. The method of claim 30, wherein at least one sapphire layer of the one or more free-standing mechanically ground and polished sapphire layers is mechanically ground to a thickness of from about 50 microns to about 250 microns.

32. The method of claim 30, wherein at least one sapphire layer of the one or more free-standing mechanically ground and polished sapphire layers is mechanically ground to a thickness of from about 50 microns to about 100 microns.

* * * * *